United States Patent Office 3,244,588
Patented Apr. 5, 1966

3,244,588
METHOD OF INHIBITING COUGH WITH THIAXANTHENOL DERIVATIVES
Iver Møller Nielsen, Holte, Denmark, assignor to Kefalas A/S, Copenhagen-Valby, Denmark
No Drawing. Filed Aug. 29, 1963, Ser. No. 305,535
22 Claims. (Cl. 167—55)

This application is a continuation-in-part of my application Serial No. 249,343, now abandoned.

This invention relates to an anti-tussive preparation and is moreover concerned with a method of combating the cough reflex.

In the past, several drugs exerting anti-tussive effects have been devised, some of which have attained outstanding importance and wide distribution. As representative examples of such anti-tussive drugs may be mentioned codeine phosphate, acetyldimethyldihydrothebain hydrochloride, 2,6 - di-tert.butyl-naphthalin-sodium-sulfonate, narcotinhydrochloride, dihydrocodeinone and various alkaloids such as ipecacuanha. Unfortunately enough, however, the more important of these drugs exert besides the anti-tussive effect also undesirable side effects, such as sedation, constipation, anti-respiratory effect, nausea and, especially for the opium alkaloids, also drug addiction. There has accordingly been a need for drugs exerting a more specific anti-tussive or cough inhibiting effect, which effect is now recognized as a pharmacological activity separate and distinct from analgesic activity and "without parallelism" thereto [50 C.A., 2865b (1956)]. Although some promising anti-tussive drugs, whereby side effects are to a large extent avoided, have appeared on the market in recent years, all of these drugs for one reason or another leave much to be desired. The need for other and improved compositions for effectively combating the cough reflex, without undesirable side effects, is apparent.

It is, therefore, an object of the present invention to provide novel compositions which are useful in blocking, preventing, inhibiting, reducing, or ameliorating coughing spells without attendant side effects of consequence.

Another object of this invention is to provide novel thiaxanthenol-10 compositions which are particularly well-adapted for oral or parenteral administration to combat cough.

Still another object of this invention is to provide a method of counteracting cough without producing undesired side effects.

The foregoing and additional objects have been accomplished by the prevision of novel compositions containing as active ingredient a thiaxanthenol-10 derivative of the general formula:

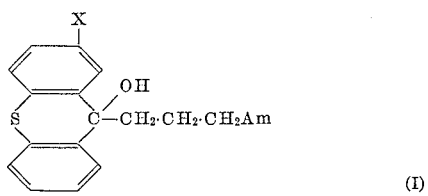

(I)

wherein X represents hydrogen, halogen or a lower-alkyloxy group and Am represents a di-lower-alkyl amino group or a piperidino, pyrrolidino, morpholino, thiamorpholino, or hexamethyleneimino group, or an acid addition salt thereof and a method for the oral or parenteral administration thereof.

As used throughout this specification, therefore, the term "active ingredient" refers to thiaxanthenols of Formula I or a pharmaceutically acceptable acid addition salt thereof.

In the foregoing Formula I and elsewhere herein, the terms lower-alkyl and lower-alkyloxy refer to an alkyl or alkoxy radical respectively containing up to and including four carbon atoms, which may have either straight or branched chain structures, for example, methyl, ethyl, propyl, isopropyl, butyl, isobutyl, methoxy, ethoxy, propoxy, isopropoxy, butoxy, or the like.

When employing the active ingredient of the compositions of the invention in the form of an acid addition salt, the acid is selected so as to contain an anion which is non-toxic and pharmaceutically acceptable, at least in usual therapeutic doses. Representative salts which are included in this group are the hydrochloride, hydrobromide, sulphate, acetate, phosphate, nitrate, quinate, methanesulfonate, ethanesulfonate, lactate, citrate, tartrate, and maleate. Other acid addition salts are equally suitable and may be employed if desired. The salts of the thiaxanthenols of Formula I with cation exchange resins deserve special mention, as they have proved valuable in oral sustained release preparations since the free base or a biologically-absorbable moiety is released from these resin salts slowly and over an extended period of time. These resin salts, therefore, likewise fall within the scope of those utilizable as the active ingredient according to the present invention.

In general, the active ingredient of the novel compositions may conveniently be prepared by treating thiaxanthone or the appropriate substituted thiaxanthone with a compound of the formula $AmCH_2 \cdot CH_2 \cdot CH_2MgBr$ wherein Am is as defined above, hydrolyzing the metal-organic complex formed, and isolating the product in conventional manner, either in the form of the free base, which is ordinarily a white crystalline substance, or an acid addition salt thereof. The active ingredient may also be prepared by reacting a thiaxanthene of the general formula:

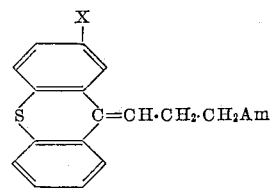

wherein X and Am are as defined above, with strong sulfuric acid, hydrolyzing and isolating the active ingredient in conventional manner.

The thiaxanthenols of Formula I are previously known, for example, from U.S. Patent No. 3,047,580 where the substances are described as intermediates for the preparation of the corresponding thiaxanthene derivatives.

According to the present invention, a thiaxanthenol of Formula I, or an acid addition salt thereof, is associated with a non-toxic pharmaceutical diluent or carrier which may be either a solid material or a liquid. Bland carriers are preferred for some applications. The compositions can take the form of tablets, powders, capsules, liquid solutions, emulsions or suspensions, or other dosage forms which are useful for oral or parenteral administration. Liquid or semi-liquid diluents may be employed and such a medium can be or contain a solvent such as water, especially when used for preparing injectable solutions. The only basic limitations of the liquid diluent used are compatability and palatability. When an aqueous solution is desired, it is preferred to employ a salt of the thiaxanthenol with a weaker acid, preferably an organic acid such as acetic, citric, lactic, fumaric, tartaric, or the like, since salts of the thiaxanthenols of Formula I with strong mineral acids, although effective, frequently give a less than optimum appearance in aqueous solution due to the formation of small amounts of the corresponding thiaxanthylium ion. The compositions can take the form of a thiaxanthenol of Formula I or an acid addition salt thereof admixed with solid diluents and/or tableting adjuvants such as rice starch, corn starch, potato starch, lactose, saccharose, gelatin, talc, stearic acid, magnesium stearate, carboxymethylcellulose, gums such as gum Acacia or Tragacanth, chicle, agar-agar, or the like. Any of the tableting materials used in pharmaceutical practice can be employed where there is no incompatability with the active ingredient. The material can be tableted or otherwise compounded with or without buffers or other pharmacologically active or coactive materials, such as analgesics, sedatives, antacids, antispasmodics, vasoconstrictors, bronchodilators, or the like. Alternatively, the active ingredient with or without adjuvant material can be placed in a capsule of absorbable material, such as the usual gelatin capsule, and administered in that form.

High concentrations of a thiaxanthenol of Formula I or a salt thereof can be obtained by utilizing tablet triturates. In yet another embodiment, the powdered active ingredient with adjuvant material can be put into powder packets. Other examples of compositions in which the active ingredient may be embodied are as follows:

It can be prepared in the form of a laminated or enteric coated tablet for prolonged action; it can be combined with an analgesic, e.g., acetylsalicylic acid, phenacetin, propoxyphen, or the like; it can be combined with phenobarbital or other sedative barbiturate or narcotic, for example codeine, or the like; it can be combined with local anesthetics effective in the gastrointestinal tract, such as procaine hydrochloride, novocaine, benzocaine, or the like; it can be combined with a diuretic compound, such as chlorthiazide, hydrochlorthiazide, or the like; or it may be combined with any other adjuvant or bulk-producing material, such as methylcellulose or carboxymethycellulose, or combinations of the foregoing can be provided. Where the active ingredient is combined with one or more other pharmaceutically active materials, it is of course necessary that the materials be compatible and that the anti-tussive effect of the active ingredient of the present invention not be adversely affected thereby. Besides the foregoing mentioned forms, the compositions of the invention may also take the form of candies, soft drinks, gums, lozenges, syrups, elixirs, and the like. Reference is made to U.S. Patents 1,907,203, 2,196,768 and 2,433,244 for representative tablet coatings for lamination or enteric coatings; to U.S. Patent 2,875,130 for other representative sustained release type formulations which may be employed; to Remington on Pharmacy for various pharmaceutical formulations and procedures which may be employed; and to the specifications and examples of U.S. Patents 2,753,288 and 2,881,113 for additional pharmaceutical forms, carriers and types of formulations and combinations in which the active ingredient of this invention may be substituted for the active ingredient of the two patents in question.

The proportion of active ingredient in the compositions of the present invention can be varied. It is only necessary that the active ingredient constitute an effective amount, i.e., such that a suitable dosage will be obtained consistent with the dosage form employed. Obviously several unit dosage forms may be administered at about the same time. Not less than about one milligram for small children and five milligrams for adults are used per unit dose, since the use of less than such dosage has not demonstrated any practical value in attaining the desired results. Likewise, it has been found that although an amount greater than 100 milligrams of active ingredient is effective, it may increase the incidence of side effects somewhat and it is therefore preferred to use from about 5 to 50 milligrams per dosage unit in order to obtain satisfactory anti-tussive effect without serious side-reactions. The figures given are for the free base, and amounts of a particular acid addition salt will of course be suitably adjusted to employ equivalent amounts of the free base considering the molecular weight of the acid moiety thereof. Expressed in terms of percentages, the active ingredient in the novel compositions of the present invention ordinarily comprises from 0.1 to about 80 weight percent, preferably from about 0.5 to about 60 percent, varying because of the form which the composition takes from very low in liquid preparations and bulky tablets or liquids, as in combination with other coactive materials, to quite high in the case of tablets containing the single active ingredient or other solid dosage form. With most solid dosage forms, the percentage is preferably about ten to sixty percent by weight of the composition.

The method of the invention as will be apparent from the foregoing, is the process of counteracting the cough reflex (e.g., as outwardly manifested by coughing and coughing spells) which comprises administering to a human being an effective amount, e.g., from about one to about 100 milligrams, preferably 5 to 50 milligrams, of a thiaxanthenol of Formula I or the equivalent of an acceptable acid addition salt thereof per unit dose, together with a non-toxic pharmaceutical carrier or diluent.

Of the thiaxanthenols of Formula I the 2-methoxy-substituted compounds have proved especially valuable as anti-tussives and especially the compound 2-methoxy-10-(3'-dimethylaminopropyl)-thiaxanthenol-10 has been shown to possess an outstanding anti-tussive effect combined with a comparatively low acute toxicity.

The following examples are given by way of illustration only and are not to be construed as limiting.

*Example 1.—Tablet formulation*

A suitable formulation for a tablet containing 10 milligrams of 2 - methoxy-10-(3'-dimethylaminopropyl)-thiaxanthenol-10 (M.P. 123–124 degrees centigrade) (in the examples designated N 7020 for short) is as follows:

|  | Mg. |
|---|---|
| N 7020 | 10 |
| Lactose | 18 |
| Potato starch | 38 |
| Gelatine | 2 |
| Talcum | 2 |
| Magnesium stearate | 0.1 |

Tablets having the above composition were prepared and found effective in the reduction of fits of coughs in accord with the present invention.

The composition of this example is equally suitable for incorporation of other anti-tussive compounds, according to the present invention and within the scope of Formula I, which may be substituted for N 7020.

*Example 2.—Tablet formulation*

Another suitable formulation for a tablet containing 10 milligrams of N 7020 is as follows:

|  | Mg. |
|---|---|
| N 7020 | 10 |
| Potato starch | 40 |
| Polyvinylpyrrolidone | 5 |

Sugar coated and colored.

The composition of this example is equally suitable for incorporation of other anti-tussive compounds, according to the present invention and within the scope of Formula I, which may be substituted for N 7020.

*Example 3.—Tablet formulation*

A suitable formulation for a capsule containing 10 milligrams of N 7020 is as follows:

|  | Mg. |
|---|---|
| N 7020 | 10 |
| Corn starch | 90 |
| Lactose | 50 |
| Talcum | 2 | filled in a gelatine capsule.

The composition of this example is equally suitable for incorporation of other anti-tussive compounds, according to the present invention and within the scope of Formula I, which may be substituted for N 7020.

*Example 4.—Solution for injection*

A suitable formulation for an injectable solution containing one percent of N 7020 in the form of its acetate is as follows:

| | |
|---|---|
| N 7020, acetate | mg__ 12 |
| Sorbitol | mg__ 40 |
| Sterile water to make | ml__ 1 |

The composition of this example is equally suitable for incorporation of other anti-tussive compounds, according to the present invention and within the scope of Formula I, which may be substituted for N 7020.

*Example 5.—Liquid oral formulation*

A suitable formulation for 1 liter of a liquid mixture containing 2 milligrams of N 7020 in one milliliter of the mixture is as follows:

| | G. |
|---|---|
| N 7020 | 2 |
| Saccharose | 250 |
| Glucose | 300 |
| d-Sorbitol | 150 |
| Agar-agar | 0.15 |
| Methylparaben | 0.5 |
| Propylparaben | 0.05 |
| Orange flavor | 10 |
| Tartrazine yellow. | |

Purified water to make a total of 1000 ml.

The composition of this example is equally suitable for incorporation of other anti-tussive compounds, according to the present invention and within the scope of Formula I, which may be substituted for N 7020.

*Example 6.—Liquid oral formulation*

Another suitable formulation for 1 liter of a liquid mixture containing 2 milligrams of N 7020 in one milliliter of the mixture is as follows:

| | G. |
|---|---|
| N 7020 | 2 |
| Tragacanth | 7 |
| Glycerol | 50 |
| Saccharose | 400 |
| Methylparaben | 0.5 |
| Propylparaben | 0.05 |
| Black currant-flavor | 10 |
| Red No. 2 C.I. 184 | 0.02 |

Purified water to make a total of 1000 ml.

The composition of this example is equally suitable for incorporation of other anti-tussive compounds, according to the present invention and within the scope of Formula I, which may be substituted for N 7020.

*Example 7.—Liquid oral formulation*

Another suitable formulation for 1 liter of a liquid mixture containing 2 milligrams of N 7020 in the form of the acetate in one milliliter of the mixture is as follows:

| | G. |
|---|---|
| N 7020, acetate | 2.4 |
| Saccharose | 400 |
| Bitter orange peel tincture | 20 |
| Sweet orange peel tincture | 15 |

Purified water to make a total of 1000 ml.

The composition of this example is equally suitable for incorporation of other anti-tussive compounds, according to the present invention and within the scope of Formula I, which may be substituted for N 7020.

*Example 8.—Animal experiments*

In order to demonstrate the anti-tussive effect of the compositions according to the invention, experiments were carried out on animals.

(a) The anti-tussive effect of 2-methoxy-10-(3'-dimethylaminopropyl)-thiaxanthenol-10 was demonstrated in cats according to the method described by Domenjoz. In cats, anesthetized with allylpropylmal, 70 mg./kg. i.p.+10 mg./kg. i.v., the nervus laryngus superior was set free and stimulated electrically every five minutes. The stimulation was adjusted at the beginning of the experiment in such way that in the untreated animal it caused a reproducible coughing spell. In a total of 13 such experiments with N 7020 the stimulation was varied from animal to animal within the following limits: 5–10 Hz., 0.2–1 millisecond, 1–5 volt, duration 5–10 seconds. The coughing spells were registered chymographically by means of a tambour. The coughing spells produced as mentioned above was inhibited by N 7020 in the following doses: 0.5 mg./kg. i.v. (inhibition for 15–45 minutes) and 1 mg./kg. p.o. (the inhibition sets in about 10–30 minutes and lasts 15–40 minutes). Codeine phosphate is effective in the same test in doses of 2 mg./kg. i.v. and 5 mg./kg. p.o. which indicates that N 7020 is five times as effective in inhibiting a coughing spell as the well-known anti-tussive drug codein phosphate.

The same test was carried out with the following thiaxanthenols of Formula I:

2-methoxy-10-(3'-diethylaminopropyl) - thiaxanthenol-10 (M.P. 109–110 degrees centigrade and called N 7097 for short), 2-methoxy-10-(3'-N-piperidinopropyl) - thiaxanthenol-10 (M.P. 124–125 degrees centigrade and called N 7098 for short), 2-chloro-10-(3'-dimethylaminopropyl) - thiaxanthenol-10 (M.P. 152–153.5 degrees centigrade and called N 706 for short), and 10-(3'-dimethylaminopropyl) - thiaxanthenol - 10 (M.P. 155–156 degrees centigrade and called N 705 for short), and it was found that N 7097, N 7098 and N 706 have anti-tussive effects of the same degree as codeine phosphate, while N 705 showed an anti-tussive effect of approximately one half of codeine phosphate. Other effective anti-tussive compounds are the corresponding pyrrolidino, morpholino, thiamorpholino, and hexamethyleneimino compounds.

In experiments on rabbits anesthetized with urethane it was shown that N 7020 had no detrimental influence on the respiration frequency or volume in doses of 0.06 to 1 mg./kg. i.v.

N 7020 has a moderate bronchospasmolytic effect against bronchospasms produced by acetylcholine in guinea pigs. 7.40 mg./kg. N 7020 i.v. reduce bronchospasms by 50%. It has a strong bronchospasmolytic effect against bronchospasms produced by serotonin in guinea pigs. 0.08 mg./kg. N 7020 i.v. reduce spasms by 50%.

N 7020 has a strong inhibiting action on edema in rats produced by subcutaneous injection of different phlogistics. N 7020 injected i.p. ½ hour before the phlogistic inhibits the formation of the endema which normally develops under such conditions as it appears from the following table:

| Phlogistic | Edema inhibition in percent | | |
|---|---|---|---|
| | Dextran 0.1% | Egg albumen | Serotonin 0.05% |
| N 7020, mg./kg.: | | | |
| 25 | 55 | 66 | 59 |
| 50 | 51 | 82 | 80 |

N 7020, administered in dosages of 12.5 and 25 mg./kg. i.p. daily for six days, also reduce an exudative inflammation produced by injection of 1% crotonoil in a subcutaneous pocket by 35 and 43% respectively.

*Acute toxicity.*—In a determination of the $LD_{50}$ of N 7020 in mice, the following values were found:

Mice i.v.:
 $LD_{50}\pm$s.e.m., mg./kg.
 $60\pm4$
Mice i.p.: $125\pm11$

*Acute toxicity.*—In a determination of the $LD_{50}$ of N "s.e.m." means "standard error of the mean."

Example 9.—Clinical evaluation

In clinical tests the compositions and active ingredients of the invention have shown pronounced effect in inhibiting coughing spells or seizures without any serious side effects.

The high order of activity of the active agents of the present invention and compositions thereof, as evidenced by tests in lower animals, is indicative of ultility based on their valuable activity in human beings as well as in lower animals. Clinical evaluation in human beings has not been completed, however. It will be clearly understood that the distribution and marketing of any compound or composition falling within the scope of the present invention for use in human beings will of course have to be predicated upon prior approval by governmental agencies, such as the U.S. Federal Food and Drug Administration, which are responsible for and authorized to pass judgment on such questions.

Various modifications may be made in the compositions and method of the present invention without departing from the spirit and scope thereof and will be apparent to one skilled in the art, and it is therefore to be understood that the invention is limited only by the scope of the appended claims.

I claim:
1. The method of relieving coughing in an animal which comprises orally administering, to said afflicted animal, an effective quantity of an anti-tussive compound selected from the group consisting of thiaxanthenols of the formula:

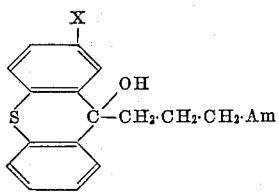

(I)

wherein X is selected from the group consisting of hydrogen, halogen and lower-alkyloxy having from one to four carbon atoms, and Am in a tertiary amino group selected from the group consisting of di-lower alkyl amino, piperidino, pyrrolidino, thiamorpholino, and hexamethyleneimino, and non-toxic pharmaceutically acceptable acid addition salts thereof, the amount of the effective anti-tussive compound being sufficient to provide effective anti-tussive relief but less than that amount which causes undesirable side effects.

2. The method of the preceding claim 1 wherein the active anti-tussive compound is administered in combination with a pharmaceutically acceptable carrier therefor.

3. The method of relieving coughing in an animal which comprises orally administering, to said afflicted animal, an effective quantity of between about one and about 100 milligrams of an anti-tussive compound selected from the group consisting of thiaxanthenols of the formula:

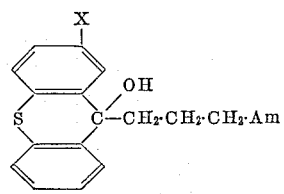

(I)

wherein X is selected from the group consisting of hydrogen, halogen and lower-alkyloxy having from one to four carbon atoms, and Am is a tertiary amino group selected from the group consisting of di-lower alkyl amino, piperidino, pyrrolidino, morpholino, thiamorpholino, and hexamethyleneimino, and non-toxic pharmaceutically acceptable acid addition salts thereof, the amount of the effective anti-tussive compound being sufficient to provide effective anti-tussive relief but less than that amount which causes undesirable side effects.

4. The method of the preceding claim 3 wherein the anti-tussive compound is 2-methoxy-10-(3'-diethylaminopropyl)-thiaxanthenol-10.

5. The method of the preceding claim 3 wherein the anti-tussive compound is 2-methoxy-10-(3'-N-piperidinopropyl)-thiaxanthenol-10.

6. The method of the preceding claim 3 wherein the anti-tussive compound is 2-chloro-10-(3'-dimethylaminopropyl)-thiaxanthenol-10.

7. The method of the preceding claim 3 wherein the anti-tussive compound is 10-(3'-dimethylaminopropyl)-thiaxanthenol-10.

8. The method of the preceding claim 3, wherein the active anti-tussive compound is administered in combination with a pharmaceutically acceptable carrier therefor.

9. The method of relieving coughing in an animal which comprises orally administering, to said afflicted animal, an effective quantity of between about five and about fifty milligrams of an anti-tussive compound selected from the group consisting of

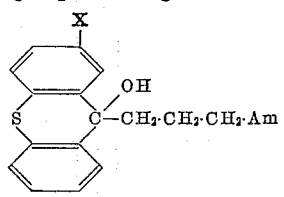

(I)

wherein X is selected from the group consisting of hydrogen, halogen and lower-alkyloxy having from one to four carbon atoms, and Am is a tertiary amino group selected from the group consisting of di-lower alkyl amino, piperidino, pyrrolidino, morpholino, thiamorpholino, and hexamethyleneimino, and non-toxic pharmaceutically acceptable acid addition salts thereof, the amount of the effective anti-tussive compound being sufficient to provide effective anti-tussive relief but less than that amount which causes undesirable side effects.

10. The method of the preceding claim 9, wherein the active anti-tussive compound is administered in combination with a pharmaceutically acceptable carrier therefor.

11. The method of relieving coughing in an animal which comprises orally administering, to said afflicted animal, an effective quantity of 2-methoxy-10-(3'-dimethylaminopropyl)-thiaxanthenol-10, the amount of the effective anti-tussive compound being sufficient to provide effective anti-tussive relief but less than that amount which causes undesirable side effects.

12. The method of relieving coughing in an animal which comprises orally administering, to said afflicted animal, an effective quantity of between about one and about 100 milligrams of 2-methoxy-10-(3'-dimethylaminopropyl)-thiaxanthenol-10, the amount of the effective anti-tussive compound being sufficient to provide effective anti-tussive relief but less than that amount which causes undesirable side effects.

13. The method of relieving coughing in an animal which comprises orally administering, to said afflicted animal, an effective quantity of between about five and about fifty milligrams of 2-methoxy-10-(3'-dimethylaminopropyl)-thiaxanthenol-10, the amount of the effective anti-tussive compound being sufficient to provide effective anti-tussive relief but less than that amount which causes undesirable side effects.

14. The method of the preceding claim 11, wherein the active anti-tussive compound is administered in combination with a pharmaceutically acceptable carrier therefor.

15. The method of the preceding claim 12, wherein the active anti-tussive compound is administered in combination with a pharmaceutically acceptable carrier therefor.

16. The method of the preceding claim 13, wherein the active anti-tussive compound is administered in combination with a pharmaceutically acceptable carrier therefor.

17. The method of relieving coughing in an animal which comprises orally administering, to said afflicted animal, an effective quantity of a non-toxic pharmaceutically acceptable acid addition salt of 2-methoxy-10-(3'-dimethylaminopropyl)-thiaxanthenol-10, the amount of the effective anti-tussive compound being sufficient to provide effective anti-tussive relief but less than that amount which causes undesirable side effects.

18. The method of relieving coughing in an animal which comprises orally administering, to said afflicted animal, an effective quantity of between about 1 and about 100 milligrams of a non-toxic pharmaceutically acceptable acid addition salt of 2-methoxy-10-(3'-dimethylaminopropyl)-thiaxanthenol-10, the amount of the effective anti-tussive compound being sufficient to provide effective anti-tussive relief but less than that amount which causes undesirable side effects.

19. The method of relieving coughing in an animal which comprises orally administering, to said afflicted animal, an effective quantity of between about 5 and about 50 milligrams of a non-toxic pharmaceutically acceptable acid addition salt of 2-methoxy-10-(3'-dimethylaminopropyl)-thiaxanthenol-10, the amount of the effective anti-tussive compound being sufficient to provide effective anti-tussive relief but less than that amount which causes undesirable side effects.

20. The method of the preceding claim 17, wherein the effective anti-tussive compound is administered in combination with a pharmaceutically acceptable carrier therefor.

21. The method of the preceding claim 18, wherein the effective anti-tussive compound is administered in combination with a pharmacetuically acceptable carrier therefor.

22. The method of the preceding claim 19, wherein the effective anti-tussive compound is administered in combination with a pharmaceutically acceptable carrier therefor.

References Cited by the Examiner
FOREIGN PATENTS
861,521  2/1961  Great Britain.

JULIAN S. LEVITT, *Primary Examiner.*